United States Patent Office 3,706,020
Patented Dec. 12, 1972

3,706,020
CAPSTAN MOTOR CONTROL SYSTEM
Daniel M. Klang, Huntington Station, N.Y., assignor to Bucode Inc., Hauppauge, N.Y.
Filed Mar. 12, 1971, Ser. No. 123,765
Int. Cl. H02r 5/06
U.S. Cl. 318—270
6 Claims

ABSTRACT OF THE DISCLOSURE

A capstan motor control system for use in magnetic tape transports, which provides for a pre-shaped current to be applied to the motor for predetermined time intervals during starting and stopping. Under current control in the starting interval, the motor accelerates to approximately 80% of its running speed. A substantially constant voltage is then applied under which the motor asymptotically accelerates to its running speed. The pre-shaped current in the stopping interval is of opposite polarity to slow the motor speed. The motor is subsequently dynamically braked to rest.

BACKGROUND OF THE INVENTION

The present invention relates to motor control circuits, and more particularly to a motor control circuit for regulating the speed, acceleration and deceleration of a low inertia DC capstan motor in a single capstan magnetic tape transport.

Heretofore, typical capstan control systems, such as that described in U.S. Pat. No. 3,471,073, issued to G. C. Brown et al., have provided a constant current to be applied to the motor for a fixed interval in starting and stopping the motor, and a substantially constant voltage for running the motor at constant speed. During the fixed interval, the velocity of the motor increases linearly. The fixed interval is just long enough to allow the motor to attain a predetermined running speed. At the end of the interval, a constant potential is applied across the armature to maintain this running speed constant (under constant load conditions). For stopping the motor, constant current of opposite polarity is applied for a fixed interval during which the armature decelerates at a constant rate, causing a linear decrease in velocity. The deceleration interval is of just such length as to bring the armature to rest.

Such prior art systems have the disadvantage that the change to constant voltage running at the moment the motor reaches the predetermined running speed, gives rise to undesirable overshoot and oscillatory conditions. Since the motor torque during acceleration or deceleration is very substantial, sudden application of this torque causes mechanical stresses and vibration probelms in the capstan mechanism. In similar fashion sudden discontinuation of this torque also causes vibration problems.

Accordingly, the present invention provides an improved method and apparatus for controlling, in particular, the operation of a single capstan magnetic tape transport. In accordance with the invention, a pre-shaped current, preferably exponential, is applied to the motor during the accelerate portion of the cycle, for a predetermined time interval. During this interval, the motor accelerates extremely rapidly (for example, within 1.5 milliseconds) to approximately 80% of its constant running speed. Upon expiration of the interval, a constant potential is applied across the armature and the motor speed continues to increase at substantially the same rate, asymptotically approaching the running speed. Overshoot and oscillatory conditions are thereby minimized. To stop the motor, a pre-shaped current, also preferably exponential and of opposite polarity, is applied for a predetermined interval during which the armature decelerates extremely rapidly to a speed less than the running speed. At the end of this interval, the motor is effectively shunted thereby being dynamically braked to rest in a relatively short interval of time (typically 0.5 millisecond).

One object of the present invention is to provide a motor control system for regulating the starting, stopping and running speed of a low inertia motor.

Another object of the present invention is to provide a motor control system for regulating the starting, stopping and running speed of a low inertia motor which directly drives the capstan of a single capstan transport.

Yet another object of the present invention is to provide a capstan control system that applies a pre-shaped current for a fixed interval to decelerate the capstan to a velocity less than a predetremined running speed, at which point the motor is effectively shunted thereby dynamically to brake to rest.

Still another object of the present invention is to provide a capstan control system that applies a pre-shaped current for a fixed interval to accelerate the capstan to a velocity less than a predetermined running speed, at which point a predetermined voltage is impressed across the motor to allow the motor to reach its running speed.

A further object of the present invention is to provide a capstan control system which is reliable and relatively inexpensive.

BRIEF DESCRIPTION OF THE DRAWINGS

For a further understanding of the present invention, reference may be had to the accompanying drawings, in which.

BRIEF DESCRIPTION OF THE PREFERRED EMBODIMENTS

Figure 1:
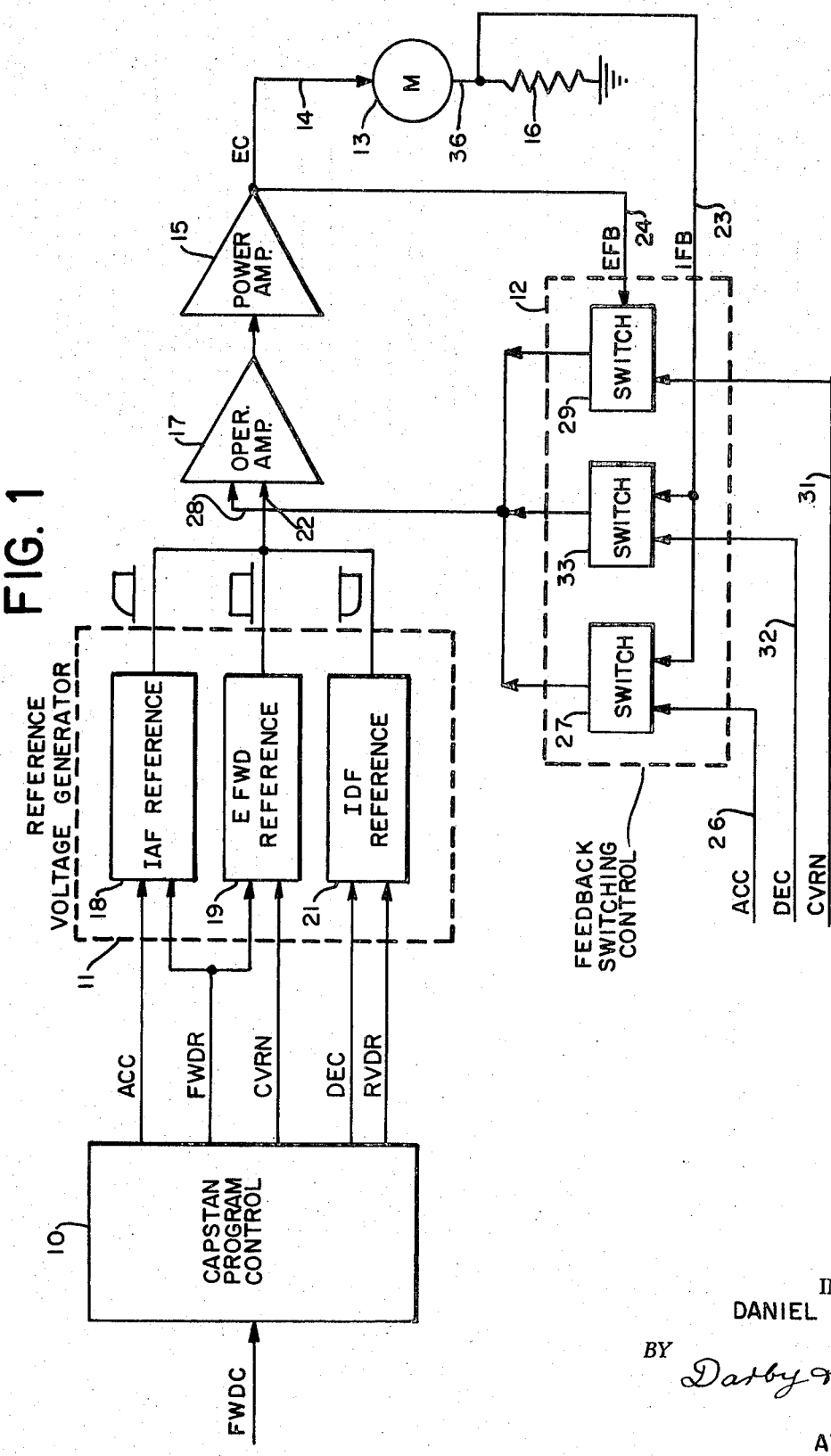
FIG. 1 is a block diagram of a single capstan control circuit in accordance with the present invention.

Referring now to the drawings, and in particular to FIG. 1, there is shown a block diagram description of the functional capstan circuits, which preferably include a capstan program control 10, a reference voltage generator 11 and a feedback switching control 12. A low inertia DC motor 13 has one terminal 14 connected to the output of a power amplifier 15 and the other terminal connected through a current-sensing resistor 16 to ground. The outputs from the reference voltage generator 11 and the feedback switching control 12 are connected respectively to inputs 22 and 28 of an operational amplifier 17, the output of which is connected to the input of the power amplifier 15.

The capstan program control circuit 10 is a time referenced signal generating circuit which may, for example, consist of a clock generator, an up/down counter, and control signal logic circuits. Such circuits need not be described herein in detail since they will be known to those skilled in the art. Briefly, however, the control signal generating logic may typically consist of a plurality of interconnected integrated circuits (not shown) certain of which generate logic pulses according to a predetermined pattern to excite motor command signals for application to the reference voltage generator 11. Timing control over the command signal generating logic may be provided by the clock generator in combination with a conventional up/down counter. It should be noted, however, that these clock and counter circuits are mentioned only by way of example, and that the known type of "one-shot" circuit is also known to provide adequate time reference control.

The capstan program control 10 becomes active upon receipt of an FWDC (forward drive command) signal from the associated computer (not shown) or other motion control circuits. In response to the FWDC signal, a logic pulse is generated which activates an FWDR (forward drive) signal. The FWDR signal is supplied to the reference voltage generator 11. This signal remains until the FWDC signal is removed.

The presence of the FWDC signal causes the generating logic to send a command to cause the capstan program control clock to start running. This causes the generation of an ACC (accelerate) signal, also to the reference voltage generator 11. The presence of the ACC signal causes the up/down counter to act as an up-counter (i.e. the clock runs forward).

As shown in FIG. 1, the reference voltage generator 11 consists essentially of three circuits, which may be defined as a forward accelerate current (IAF) reference circuit 18, a forward drive voltage (EFWD) reference circuit 19 and a forward decelerate current (IDF) reference circuit 21.

As has been described above, the FWDC signal at the capstan program control 10 excites the ACC and FWDR signals supplied to the reference voltage generator 11. Each of these signals is applied to the input of the IAF reference circuit 18. As is known in the art, such a reference circuit may consist of logic elements, a potentiometer voltage source, and capacitor charge and discharge circuits. The purpose of the IAF circuit 18 is to generate, upon excitation by the presence of the ACC and FWDR signals, a predetermined ascending voltage wave form, represented in area A of FIG. 3. This wave form is applied to the input 22 of the operational amplifier 17 and is the reference controlling the current to the armature of the motor 13. It should be noted, however, that the IAF reference circuit 18 may be designed so as to provide a substantially constant reference voltage (i.e. rectangular wave form) to the operational amplifier. As will be understood below, the pre-shaped ascending voltage wave form is preferable for operation of a magnetic tape transport.

The purpose of the operational amplifier 17 is to generate the capstan drive voltage (EC) supplied to the capstan power amplifier 14. The operational amplifier also serves as a regulatory system to compare the signal from the reference voltage generator to the actual performance of the motor. In such a system, the speed of the motor 13 is controlled by a feedback circuit which produces a signal proportional to the motor voltage (speed) or current. The operational amplifier acts as an error measuring element to compare the instantaneous values of the reference voltage against the feedback, to produce an error signal proportional to the algebraic difference. Any difference between the control signal supplied by the reference voltage generator 11, and the actual performance of the system supplied by the feedback switching control 12, is immediately corrected by a change in the ouput of the operational amplifier 17.

As indicated in FIG. 1, the feedback switching control 12 is connected across the motor 13 by means of a current feedback (IFB) lead 23, and a voltage feedback (EFB) lead 24. It should be noted that the armature voltage feedback system may alternatively be replaced by a tachometer generator (not shown) for providing the EFB signal to the switching control 12.

As described above, when the capstan program control receives a forward command, it generates the FWDR and ACC signals to the reference voltage generator. The signal IAF is thereby applied to the input of the operational amplifier 17. The signal ACC is also applied to the feedback switching control 12, as indicated in FIG. 1 by reference numeral 26. The input of the ACC signal activates a transistor switching circuit 27. Activation of the switching circuit 27 permits the current feedback (IFB), which is measured across the series resistor 16 by means of the lead 23, to be applied to the input 28 of the operational amplifier 17.

Figure 2:
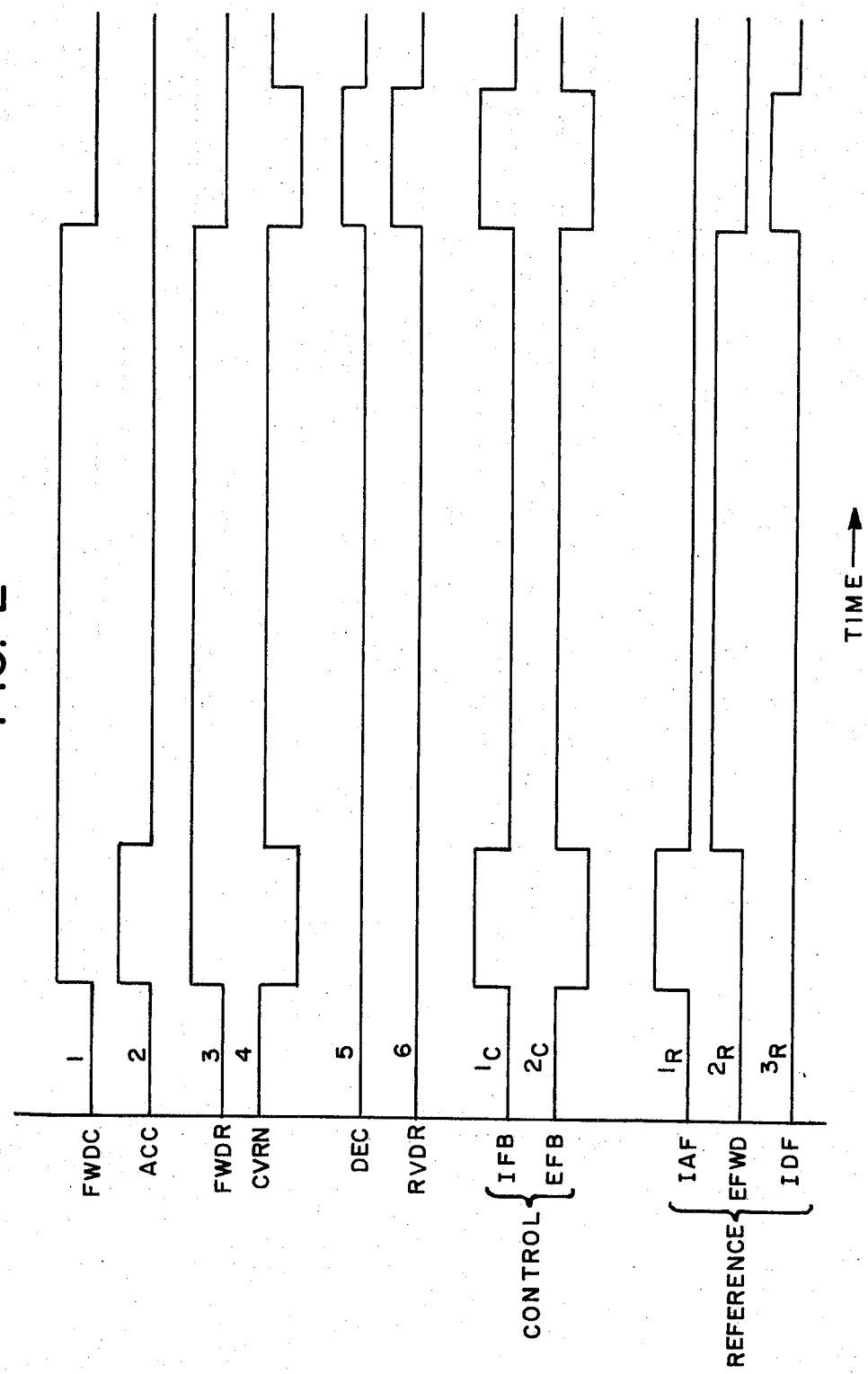
FIG. 2 is a timing diagram showing the various system parameters for the forward drive mode as a function of time.

The operation of the current control portion of the control cycle of the present system may be further understood by reference to FIG. 2, in which the chronological order of the events described above is diagrammed. As indicated, the presence of the FWDC (1), ACC (2) and FWDR (3) signals is substantially simultaneous along with the IFB ($1_C$) control signal and the IAF ($1_R$) reference signal. The determination of the duration of such signals will be described below.

The current control part of the control cycle is ended upon termination of the ACC signal. The time duration of the ACC signal is determined by the capstan program control "clock," in the preferred embodiment, by an oscillator and an up/down counter. As described above, the counter begins to operate as an up-counter upon excitation by the presence of the FWDC signal. When the counter counts up to a predetermined condition, integrated circuits within the capstan program control end the generation of clock pulses to the counter and end the generation of the ACC signal. At this time, the capstan program control 10 generates a CVRN (constant voltage run) signal which places the capstan motor in a constant voltage run mode. The motor 13 is then energized by a substantially constant voltage of predetermined magnitude, as will be explained hereinafter.

The CVRN signal is applied to the EFWD reference circuit 19 of reference voltage generator 11. A constant reference voltage is thereby generated and is applied to the operational amplifier 17 at input 22. The CVRN signal is also applied to a transistor switching circuit 29 in the feedback switching control 12, as indicated by reference numeral 31. The presence of the CVRN signal at switch 29 enables the switching control 12 to apply the EFB signal of lead 24 (rather than the IFB signal) to the operational amplifier at input 28. Under such circumstances, the operational amplifier causes the motor to run in a manner to equalize the EFB and EFWD signals.

The timing diagram of FIG. 2 indicates the chronology of the above-described events. It may be seen that the termination of the ACC signal is accompanied by the presence of the CVRN signal and the EFWD reference signal. The EFB control signal is activated upon termination of the IFB control signal. The IAF reference signal is terminated upon generation of the EFWD reference signal. It should also be noted that the FWDR signal is maintained to establish the basic running mode of the motor.

In accordance with the present invention, the capstan program control timing circuit is adjusted so that its time interval (during which the counter counts up to its predetermined amount) is less than the starting interval of the motor which commences when the capstan motor is at rest and ends when the capstan motor is running at its constant running speed. It has been found preferable to adjust the time interval so that the ACC signal is present to the reference voltage generator 11 for approximately 80% of the time interval which would be required for the motor to reach its constant running speed if the current control mode of operation were continued. From the moment of termination of the ACC signal, the remaining acceleration required for the motor to reach its constant running speed is performed under a voltage impressed method of motor control. The starting interval of the motor is therefore divided into two distinct time periods, indicated by reference areas A and B in FIG. 3, during which the motor is energized by distinctly different methods. During the current control period, the motor is preferably energized by the ascending wave form IAF reference signal. As described above, at the end of such time interval, when the motor has achieved approximately 80% of its running speed, the ACC signal is terminated and the capstan program control 10 generates the constant voltage run signal (CVRN) so that the motor is energized by a substantially constant voltage of predetermined magnitude. In this manner, the motor smoothly and asymptotically approaches its predetermined running speed, as may be seen in area B of FIG. 3, thereby minimizing overshoot and oscillatory conditions.

The stop cycle of the motor is initiated by the removal of the FWDC signal from the capstan program control 10. The capstan program control is thereby conditioned to generate a decelerate (DEC) signal to the reference voltage generator 11 and a start signal to the "clock." The DEC signal causes the "clock" to reverse the up/down counter which acts as a down-counter receiving input pulses from the oscillator until it counts down to zero. The zero count terminates the DEC signal. The presence of the DEC signal excites the decelerate reference voltage circuit 21 to generate a forward decelerate current wave form (IDF) to be applied to the input 22 of the operational amplifier 17. As indicated in area C of FIG. 3, the IDF reference signal is a descending wave form similar to the ascending wave form of IAF so that force changes imparted to the motor shaft are again minimized to avoid undesirable oscillatory conditions in the drive system.

Figure 3:
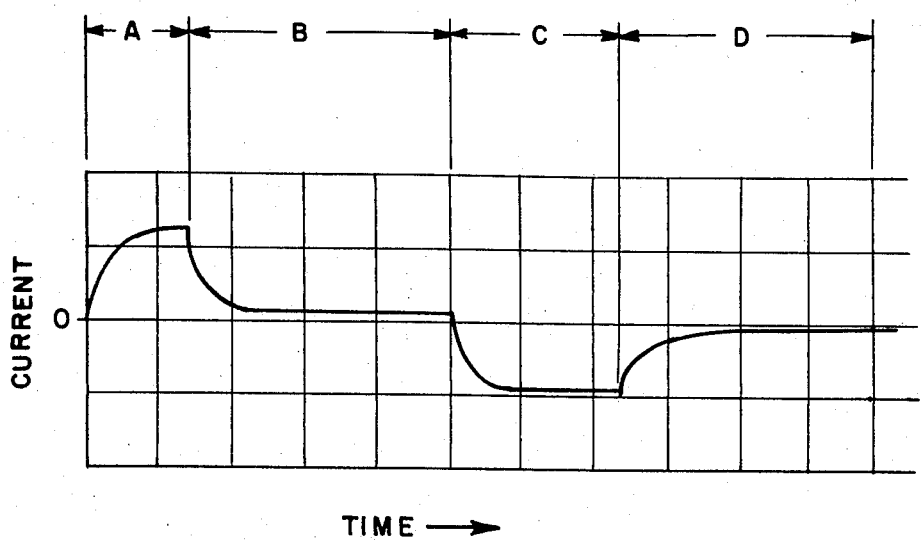
FIG. 3 is a graph showing current wave forms passing through the capstan motor during the accelerate, decelerate, run and stop periods.

In the preferred embodiment, the frequency of the clock oscillator may be adjusted to regulate the time period required for the counter to count down to zero during the current control portion of the decelerate interval. The system may be adapted, for example, to provide a DEC signal of longer duration than the ACC signal, as shown in FIG. 3. Generally, adjustment of the DEC signal duration is preferable for positioning the magnetic head in the gap between recorded data blocks. This results in optimum starting performance upon receipt of reverse or forward commands.

Referring to FIG. 1, the DEC signal is also applied to the feedback switching control 12, as indicated by reference numeral 32, to excite a transistor controlled switching circuit 33, to allow the IFB signal on lead 23 to be applied to the input 28 of the operational amplifier 17. The IDF reference voltage is of a polarity opposite to that of the IAF reference during the accelerate portion of the cycle. The effect of this change in polarity is to slow the speed of the motor 13. In accordance with the present invention, the DEC time interval of capstan program control 10 (during which the counter is counting down) is predetermined to be less than the time interval required to bring the motor to a full stop. The result is that the DEC signal is removed before the motor has stopped. Termination of the DEC signal stimulates the generation of the CVRN signal, and indicates a constant voltage mode, in a manner similar to that described in connection with the termination of the ACC signal during the accelerate portion of the cycle. The single presence of the CVRN signal to the reference voltage generator 11 does not excite an output and therefore there is no signal applied to input 22 of the operational amplifier 17. The presence of the CVRN signal at the lead 31 of the feedback switching control 12, however, enables the transistor controlled switch 29 to permit the feedback voltage from the motor 13 to be applied to the input 28 of the operational amplifier. Since the output from the power amplifier 14 will be zero voltage, the operational amplifier will be essentially comparing the counter EMF of the motor (EFB) against a zero reference input. The result is an effective short circuit or shunt across the motor. This means that the motor is serving as a generator which sees an impedance consisting of the resistance base of the power amplifier 14, the resistor 16 and the resistance of the armature. Area D of FIG. 3 shows that the motor current during the present mode of the decelerate cycle is decaying. This results from the equalizing effect of the operational amplifier, which is attempting to drive the counter EMF of the motor to zero. Such dynamic braking of the motor serves to minimize the chances of overshoot in the other direction, thereby minimizing the settling time or the time required for the armature to come to rest.

In magnetic tape transports of the type described herein, it is desirable to provide for the situation in which the capstan circuits receive an instruction to start accelerating again before the motor is fully stopped. These techniques are well known in the art, and are therefore not discussed herein in detail.

While the present embodiment of the invention has been described above in connection with the forward drive mode of the motor 13, it will be understood by those skilled in the art that the description of the present circuitry with respect to the reverse drive mode would be essentially the same, and the invention is not to be limited to the particular mode of operation described herein.

What is claimed is:

1. In a tape transport, a system for energizing an electric capstan drive motor having a predetermined running speed, said system comprising:
   means for generating a first signal of predetermined duration;
   means for generating a second signal upon expiration of said first signal;
   means responsive to said first signal for generating a first voltage wave form of predetermined shape and duration such as to energize said motor to accelerate to a first speed, said first voltage wave form comprising an ascending voltage, said first speed being substantially less than said running speed; and
   means responsive to said second signal for energizing said motor with substantially constant voltage of predetermined magnitude, to accelerate said motor to said running speed.

2. In a tape transport, a system for energizing an electric capstan drive motor having a predetermined running speed, said system comprising:
   means for generating a first signal of predetermined duration;
   means for generating a second signal upon expiration of said first signal;
   means responsive to said first signal for generating a first voltage wave form of predetermined shape and duration such as to energize said motor to accelerate to a first speed, said voltage wave form being produced by a capacitor charge circuit, said first speed being substantially less than said running speed and being a predetermined percentage of said running speed; and
   means responsive to said second signal for energizing said motor with substantially constant voltage of predetermined magnitude to accelerate said motor to said running speed.

3. The device as recited in claim 2 wherein said percentage is not more than 90%.

4. In a tape transport, a system for energizing an electric capstan drive motor having a predetermined running speed, said system comprising:
   means for generating a first signal of predetermined duration;
   means for generating a second signal upon expiration of said first signal;
   means responsive to said first signal for generating a first voltage wave form of predetermined shape and duration such as to energize said motor to accelerate to a first speed, said voltage wave form comprising an ascending voltage produced by a capacitor charge circuit, said first speed being substantially less than said running speed;
   means responsive to said second signal for energizing said motor with substantially constant voltage of predetermined magnitude to accelerate said motor to said running speed;

means for generating a third signal of predetermined duration;

means responsive to said third signal for generating a second voltage wave form of polarity opposite to said first wave form to decelerate said motor to a second speed, said second speed being less than said running speed; and means connected across said motor and responsive to the expiration of said third signal for decreasing the speed of said motor to zero.

5. The device as recited in claim 4 wherein said third signal generating means comprises means for varying the duration of said third signal.

6. In a tape transport, a method for energizing an electric capstan drive motor having a predetermined running speed, comprising the steps of:

generating a first voltage wave form of predetermined ascending shape for a first predetermined interval of time;

energizing said motor with said wave form during said interval, to accelerate said motor to a first speed, said first speed being less than said running speed;

energizing said motor subsequent to said interval with substantially constant voltage of predetermined magnitude to accelerate said motor to said running speed;

generating a second voltage wave form for a second predetermined interval of time, said second wave form being of polarity opposite to said first wave form;

energizing said motor with said second wave form during said second interval to decelerate said motor to a second speed, said second speed being less than said running speed; and decreasing the speed of said motor from said second speed to zero.

References Cited

UNITED STATES PATENTS

| | | | |
|---|---|---|---|
| 2,929,980 | 3/1960 | Anger | 318—400 X |
| 3,231,809 | 1/1966 | Greer | 318—400 |
| 3,309,597 | 3/1967 | Gabor et al. | 318—400 X |
| 3,471,073 | 10/1969 | Brown et al. | 226—188 |
| 3,293,522 | 12/1966 | Lewis | 318—327 |
| 3,251,563 | 5/1966 | Kleist et al. | 42—55.12 |
| 3,185,364 | 5/1965 | Kleist | 226—24 |

BERNARD A. GILHEANY, Primary Examiner

W. E. DUNCANSON, JR., Assistant Examiner

U.S. Cl. X.R.

318—400